United States Patent [19]

Beamon, III

[11] Patent Number: 5,091,719
[45] Date of Patent: * Feb. 25, 1992

[54] HELMET DISPLAY

[75] Inventor: William S. Beamon, III, Ormond Beach, Fla.

[73] Assignee: General Electric Company, Syracuse, N.Y.

[*] Notice: The portion of the term of this patent subsequent to Jan. 30, 2007 has been disclaimed.

[21] Appl. No.: 456,502

[22] Filed: Dec. 26, 1989

[51] Int. Cl.$^5$ ............................................. G09G 3/02
[52] U.S. Cl. .................................... 340/705; 358/93; 358/104
[58] Field of Search .................. 358/103, 104, 93, 88; 340/705, 780, 980; 350/174

[56] References Cited

U.S. PATENT DOCUMENTS 4,897,715  1/1990  Beamon, III ..................... 340/705

OTHER PUBLICATIONS

Jenkins et al., "Fundamentals of Optics", 1957, p. 6.

*Primary Examiner*—Jeffery A. Brier
*Assistant Examiner*—Regina Liang
*Attorney, Agent, or Firm*—Paul Checkovich; Stephen A. Young

[57] ABSTRACT

A helmet mountable display system may display a raster scanned image to each eye of a wearer of the helmet for presenting a stereoscopic image. The system includes a first and second lens having a respective optical axis and first and second oscillatable deflecting surfaces for generating the raster. The lenses may be arranged so that the optical axes from a V with the first and second deflecting surfaces disposed substantially at the apex of the V. This arrangement may be bilaterally symmetrical such that a plurality of light rays for forming a first image passes through the first lens along one optical path, strikes the first deflecting surface, is directed onto the second deflecting surface, and is directed through the second lens toward a focal plane where a real image is available to be supplied to one eye. Another plurality of light rays for forming a second image passes through the second lens along another optical path generally opposite to the one optical path, strikes the first deflecting surface, is directed onto the second deflecting surface and is directed through the first lens toward a focal plane where another real image is available to be supplied to the other eye. The real images are raster scanned when the first and second surfaces are oscillating in a predetermined pattern. Each light ray supplies information to a corresponding zone of the image.

21 Claims, 3 Drawing Sheets

HELMET DISPLAY

BACKGROUND OF THE INVENTION

This invention relates to helmet mountable displays, and, more particularly, to a self-contained, full color, stereoscopic high resolution helmet mountable video display, such as may be used in simulation systems like trainers, or during actual vehicle or aircraft operation as a display for sensors and/or instruments.

One type of helmet mountable display system using a four lens optical system, a folding mirror and horizontal and vertical scanning mirror is described and claimed in Beamon U.S. Pat. No. 4,897,715, assigned to the present assignee hereof and incorporated in its entirety herein by reference thereto. Although the invention as described and claimed in U.S. Pat. No. 4,897,715 offers a substantial improvement over prior display systems, the four lenses, even if able to be fabricated from a light-weight refractive material such as plastic rather than glass, still represent a significant weight that must be carried and accounted for by the wearer of the helmet.

It would be desirable to reduce further the weight of the system as described and claimed in U.S. Pat. No. 4,897,715 while still obtaining the benefits thereof. Inasmuch as such weight reduction may be anticipated to be achieved by elimination of certain components, a corresponding reduction in cost may also be expected.

Accordingly, it is an object of the present invention to provide a self-contained, light-weight helmet mountable display system.

Another object of the present system is to provide such a helmet mountable display system that may also produce full color, stereoscopic visual displays.

SUMMARY OF THE INVENTION

In accordance with the present invention, a helmet mountable display system for displaying a raster scanned image to a wearer of the helmet in response to a plurality of light source means for supplying a respective light signal comprises first lens means having a first and second optical input/output and an optical axis, second lens means having a first and second optical input/output and an optical axis, first and second deflecting, or reflecting, surfaces that are oscillatable about respective first and second axes and optical system means. As used herein, the term "optical input/output" means that the optical port so referred to may be either an optical input port to the device or an optical output port from the device depending on the configuration and use of the device within an optical circuit of the display system.

The optical components and resulting optical paths may be arranged to be bilaterally symmetrical. The first and second lens means may be disposed with respect to each other such that their respective optical axes form a V with the first and second deflecting surfaces disposed substantially at the apex of the V.

In one aspect of the present invention, the first input/output of the first lens means is optically coupled to a plurality of first light source means for receiving a respective first light signal that is available from each first light source means and for forming a collimated light pattern, the first deflecting surface is optically coupled to the second input/output of the first lens means for deflecting the collimated light pattern in a first direction along a predetermined optical path to the second deflecting surface, the second deflecting surface deflects the collimated light pattern in a second direction along the optical path to the second input/output of the second lens means and the second lens means focuses an image at a focal plane. The image available at the focal plane is a raster scanned image when the first and second surfaces are perturbating in a predetermined pattern. A planar screen, such as a rear projection screen, may be disposed to be coplanar with the focal plane. The display system may further include optical system means optically coupled to the first input/output of the second lens means for transporting the focused collimated light from the second lens means to the wearer so that the wearer may observe the raster scanned image. The first and second deflecting surfaces may be disposed such that a focal plane of the first lens means lies along the first optical path between and including the first and second surfaces.

In another aspect of the present invention for presenting a stereoscopic view, the first input/output of the second lens means is optically coupled to a plurality of second light source means for receiving a respective second light signal that is available from each second light source means and for forming another collimated light pattern, the first deflecting surface is further optically coupled to the second input/output of the second lens means for deflecting the another collimated light pattern in a first direction along another predetermined optical path to the second deflecting surface, the second deflecting surface further deflects the another collimated light pattern to the second input/output of the first lens means and the first lens means focuses another image at another focal plane. The image available at the another focal plane is a raster scanned image when the first and second surfaces are perturbating in a predetermined pattern. Another planar screen such as a rear projection screen may be disposed to be coplanar with the another focal plane. The display system may further include another optical system means optically coupled to the first input/output of the first lens means for transporting the focused collimated light from the first lens means to the wearer so that the wearer may observe the another raster scanned image. When the raster scanned image from the second lens means and the another raster scanned image from the first lens means are supplied to different eyes, then a stereoscopic view may be presented to the viewer.

The first and second optical system means may each include a combination of cooperating optical elements such as lenses, prisms, and mirrors for providing the desired gain and optical path steering as is known to one of ordinary skill in the art. In addition, as used herein "lens means" does not necessarily mean a single lens but is intended to comprehend all optical components that cooperatively act to perform the desired function of the "lens means", and may for example, include convex lenses, concave lenses, plano-convex and/or concave lenses, etc.

In all aspects of the present invention a visor mounted or secured to the helmet or fabricated integral to the helmet may be optically coupled to the optical system means and used for presenting raster scanned images to the wearer.

In yet another aspect of the present invention, the orientation of the light rays, such as in a row or column, may be coordinated with the orientation of the first and second planar surfaces for producing either a vertically scanned or a horizontally scanned image.

In still another aspect of the present invention, the collimated light rays may be reflected a plurality of times between the first and second deflecting surfaces before being sent the second input/output of the corresponding first or second lens means. Each intersurface reflection decreases the overall angle through which the first and second deflecting surface must scan, and shortens the physical dimension between the first and second lens means and the first and second deflecting surfaces for a given focal length while increasing the overall size requirements of the first and second deflecting surfaces. Thus it is seen that a practical number of such inter-surface reflections will be determined by the size of the deflecting surfaces to be accommodated on the helmet and the power needed to drive them.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
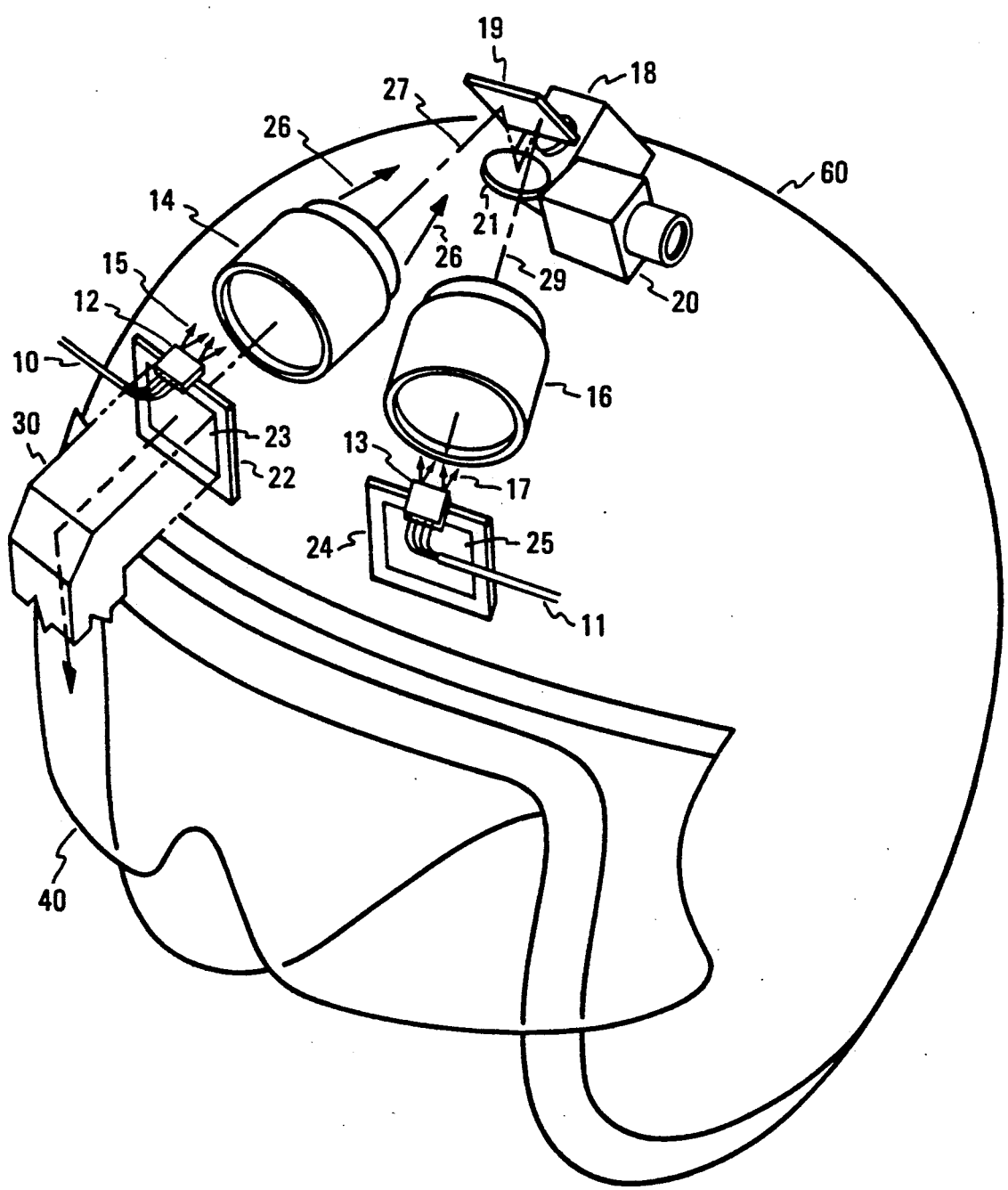
FIG. 1 is a top perspective view of a helmet mountable display system in accordance with the present invention.

Referring to FIG. 1, a top perspective view of a helmet mountable display system in accordance with the present invention is shown.

The display system comprises fiber support means 12 and 13, lens means 14 and 16, horizontal scan means 18 including horizontal scanning mirror means 19, vertical scan means 20 including vertical scanning mirror means 21 and rear projection screen means 22 and 24. Lens means 14 and 16, horizontal scanning means 18, vertical scanning means 20 and screen means 22 and 24 may be securely mounted or fastened to a helmet 60 and are appropriately oriented and aligned along optical paths as hereinafter described. Screen means 22 and 24 include respective image areas 23 and 25 which are typically planar.

The terms "horizontal" and "vertical" are used in a conventional sense to refer to square or rectangular raster-scanned images wherein the raster is scanned in orthogonal directions. However, the present invention is not limited to only true horizontal and vertical scans but will operate with a scan having orthogonal scan directions in any spatial orientation.

Fiber support means 12 and 13 each receive a respective plurality of optical waveguides or fibers 10 and 11, respectively. The actual number of fibers is equal to the number of zones from which the ultimate image is formed. For the present description, eight fibers 10 and eight fibers 11 will be used, it being understood that a greater or lesser number may be employed. In addition, light emission from the ends of fibers 10 is used to form a full color image on screen 24 and light emission from the ends of fiber 11 is used to form a full color image on screen 22 in response to respective color information, wherein the images on screens 22 and 24 are correlated to each other for ultimately supplying a respective image to each eye of an observer wearing helmet 60 and thereby providing a stereoscopic view. A detailed explanation for forming a raster scanned full-color image from the ends of fibers may be had by reference to Beamon U.S. Pat. No. 4,897,715.

The optical path for producing the image for screen 24, which corresponds to the image for the left eye of a wearer of helmet 60, will be described in detail, it being understood that the optical path for producing the image for screen 22, which corresponds to the image for the right eye of a wearer of helmet 60, may be analogously constituted. Fibers 10 are fixedly held at their ends by support 12 so that the ends of fibers 10 are linearly arranged, such as in a row or column. For purposes of this discussion, assume that a horizontal direction is defined by a plane including both central optical axes 27 and 29 of lenses 14 and 16, respectively. Therefore, a vertical direction lies in a plane that is perpendicular to the horizontal defining plane. Fibers 10 are shown disposed at the top of screen 22 in a row that is substantially horizontal. Alternatively, fibers 10 may be disposed in a horizontal row at the bottom of screen 22. Support 12 may be fixedly secured to screen 22 and/or to helmet 60. Ideally, it is desirable that both the center of the row of ends of fibers 10 and the center of image area 23 of screen 22 lie along central optical axis 27 of lens 14. However, such orientation is not practicable in that one of screen 22 or ends of fibers 10 would interfere with the function of the other, depending on which one was closer to lens 14 along axis 27. In order to accommodate both screen 22 and holder 12 with ends of fibers 10, a compromise is required which places the center of the row of ends of fibers 10 as close to axis 27 as possible so that lens 14 is able to intercept light emitted from each end of fibers 10, and then collimate, converge and direct it so that all converging ray paths will be intercepted by mirror 19 while still permitting a desired full image (from ends of fibers 11) to be formed on screen 22. Thus generally neither the center of the row of ends of fibers 10 nor the center of image area 23 of screen 22 will lie along central optical axis 27 of lens 14. These same spacing considerations apply equally to screen 24 having an image area 25, holder 13 with fibers 11 and lens 16.

Light from the end of each of fibers 10 and 11 disperses within a conical envelop, the margins of two pairs of which are indicated by reference numerals 15 and 17, respectively. Light from the ends of each of fibers 10 is intercepted by lens 14 which collimates and focuses the intercepted light to converge within outer margin 26 of the multiple light ray paths that are directed from fibers 10 toward mirror 19 of horizontal scan means 18. Upon striking mirror 19, the incident light is reflected onto mirror 21 of vertical scan means 20. Mirror 21 may direct light incident thereon directly toward lens 16. However, for increasing the overall optical path length from ends of fibers 10 to screen 24, mirror 21 may direct light incident thereon back to mirror 19 and the second reflection of the same group of rays from mirror 19 may then be directed toward lens 16 about optical axis 29. This single or double reflection from mirror 19 may eliminate the need for a folding mirror such as was illustrated in a configuration shown in U.S. Pat. No. 4,897,715. Further, a double reflection from mirror 19 reduces the overall angle through which mirror 19 must oscillate to about one-half that required if mirror 21 directs light received from mirror 19 directly to lens 16 for obtaining the same scan width.

Mirrors 19 and 21 are preferably disposed with respect to each other such that outer margin 26 of the collimated light pattern formed by the multiple light ray paths from lens 14 obtains a minimum diameter along the optical path between and including mirrors 19 and 21. In any event mirrors 19 and 21 are disposed and appropriately sized such that mirrors 19 and 21 intercept and reflect light in all light ray paths directed toward or from them.

Lens 16 intercepts the first or second reflection of a ray from mirror 19 and focuses it to converge onto image area 25 of screen 24. Image area 25 of screen 24, as well as ends of fibers 10, are disposed at the reverse focal plane of lens 16. Likewise image area 23 of screen 22 as well as ends of fibers 11 are disposed at the reverse focal plane of lens 14. A focal plane is a plane that is disposed perpendicular to the central optical axis at the focal point of the lens.

Figure 2:
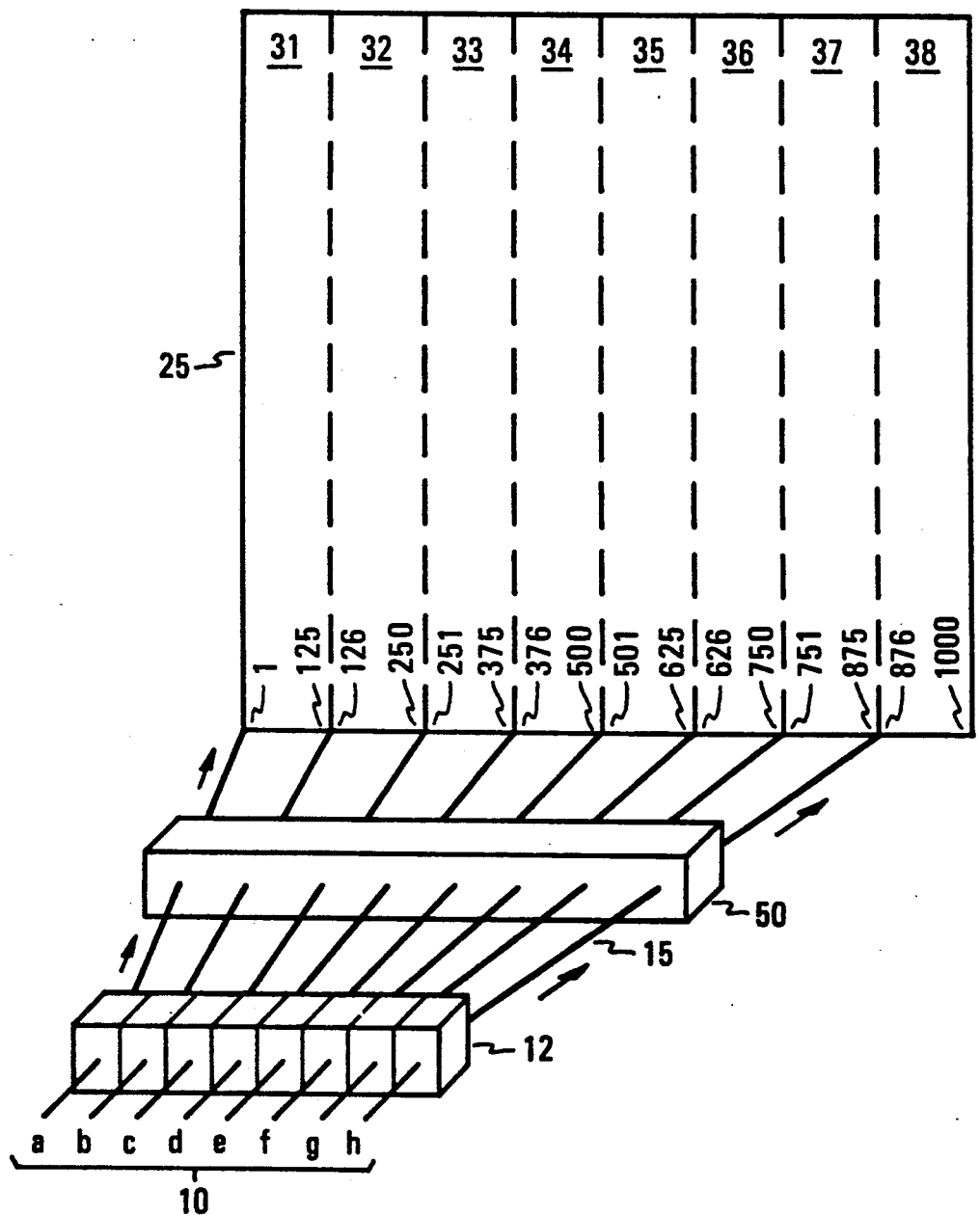
FIG. 2 is a schematic diagram of an image display in accordance with the present invention.

Referring to FIG. 2, a schematic diagram of a portion of the display system of FIG. 1 is shown. The image path from eight individual fibers 10a to 10h of fibers 10 (FIG. 1) to screen 25, which ultimately displays an image to be supplied to the left eye of a viewer wearing helmet 60 (FIG. 1), is illustrated. It is to be understood that the image path from fibers 11 (FIG. 1) to screen 22 is analogous.

The optics of the image path from individual fibers 10a to 10h of fibers 10 (FIG. 1) to screen 25 include lenses 14 and 16 (FIG. 1) vertical scan mirror 21 and horizontal scan mirror 19 that are collectively represented by block 50. It is noted that screen 25 is divided into eight contiguous bands, or zones, 31 to 38, that are disposed in a vertical direction, each zone for displaying a portion of the image. There are a corresponding equal number (i.e., eight) of fibers 10a-10h for providing video information to respective zones. Thus, fiber 10a supplies video information in the form of a modulated light signal for zone 31, fiber 10b for zone 32, and so on. In addition, zones 31-38 are marked to indicate the pixel numbers along a line (horizontal direction) of a raster having 1000 picture elements (pixels) per line. For eight zones and a raster having 1000 lines per frame and 1000 pixels per line, each zone contributes 125 pixels along each of the 1000 lines. Thus, zone 31 includes pixels 1-125 of each raster line, zone 32 pixels 126-250, and so on.

The actual image to be displayed on screen 25 is formed by modulated light emitted from the ends of fibers 10a-10h. The optics of the image path from individual fibers 10a-10h of fibers 10 (FIG. 1) to screen 25, are arranged so that an image of each individual end of fibers 10a-10h is formed on screen 25 when screen 25 is appropriately disposed at the reverse focal plane of lens 16 (FIG. 1). That is, light output from each end of fibers 10a-10h spreads out in a cone, which is then collimated by lens 14, subjected to scanning by vertical scanning means 20 and horizontal scanning means 18, and is reimaged to the size of a pixel point on screen 25 by lens 16. From the size of screen 25, the size of the image of the ends of fibers 10a-10h necessary to permit the required number of pixels to be disposed in each of zones 31-38 of screen 25, and the overall optical gain provided by lenses 14 and 16, the appropriate size of the end of fibers 10a-10h may be determined. The ends of the fibers 10a-10h are generally round. However, other shapes, such as square or hexagonal, may be used if desired.

For one particular embodiment, round ends of fibers 10a-10h, each having a diameter of about 9 microns ($9 \times 10^{-6}$ meters), a 1:1 image ratio from the input image plane (i.e., reverse focal point) of lens 14 to the output image plane (i.e., reverse focal point) of lens 16 at which screen 25 is disposed, and screen 25 having a rectangular image area of 11.2 mm vertical by 15.4 mm horizontal (i.e., 19 mm diagonal with a 3:4 aspect ratio) may be used. Horizontal mirror 19 may be scanned at 60 Hz and vertical mirror may be scanned at about 4000 Hz for a raster scanned image wherein the raster is divided into eight segments.

Emission of modulated light from the end of each of fibers 10a-10h and appropriate oscillating or rotational movement of vertical scan mirror 21 and horizontal scan mirror 19 (FIG. 1) are coordinated by synchronizing means (not shown) as is known in the art. At the beginning of pixel column 1 of the raster of zone 31 and at the beginning of corresponding first raster pixel columns of zones 32-38, mirror 21 and 19 are oriented so that the light rays from ends of fibers 10a-10h are directed to the beginning of the first pixel column of the raster in the lower left corner of zones 31-38, respectively. As vertical mirror 21 rotates, or begins to oscillate, the light rays from the ends of fibers 10a-10h scan upward along the first pixel column of the raster of zones 31-28.

At the end of the sweep of the first pixel column of the raster of zones 31-48, the light emitted from the ends of fibers 10a-10h is turned off or blanked, mirror 21 is repositioned to be able to direct the light from ends of fibers 10a-10h to the beginning of a scan column for zones 31-38, and mirror 19 is indexed, or rotated, so that the second column of each raster of zones 31-38 is ready to be scanned in its respective appropriate position. The process continues scanning lines until all the pixel columns of a field or frame are sequentially scanned. At the end of the scan of the last column of each zone 31-38, mirrors 21 and 19 are appropriately oriented so that sequential pixel columns starting with the first pixel column of zones 31-38 may be scanned again for a next field or frame.

One benefit of dividing the image to be displayed into a plurality of zones with a separate light source for scanning each zone is that the overall video bandwidth requirements are reduced. For instance, in a 1000 pixel per line image divided into eight zones, horizontal scanning mirror 19 need only be indexed to cover 125 pixel columns, or one eighth the horizontal angle subtended by screen 25, whereas without dividing the image, mirror 19 would have to be indexed to cover the entire 1000 pixel columns. Further, since the vertical scan mirror 27 need only scan 125 pixel columns, for the example cited, rather than 1000 pixel columns the vertical bandwidth is decreased by about one-eighth. Also, reducing the vertical bandwidth produces more available luminance for the display since the dwell time for each pixel is increased because the vertical scan does not have to move as rapidly as a single scan source does to display a frame of the image.

The horizontal scan angle excursion requirements are reduced due to ends of fibers 10 being separated by one-eighth of the horizontal dimension of the raster on screen 25 to be scanned. That is, one fiber is assigned to each zone. Physical limitations of the electro-mechanical scanning means used, such as the maximum rate that an oscillating scanning mirror can change direction or the maximum rotational rate that can be readily accommodated without undue gyroscopic and/or high-pitched noise side effects, will place a practical limitation on the effective number of zones that can be used.

Figure 3:
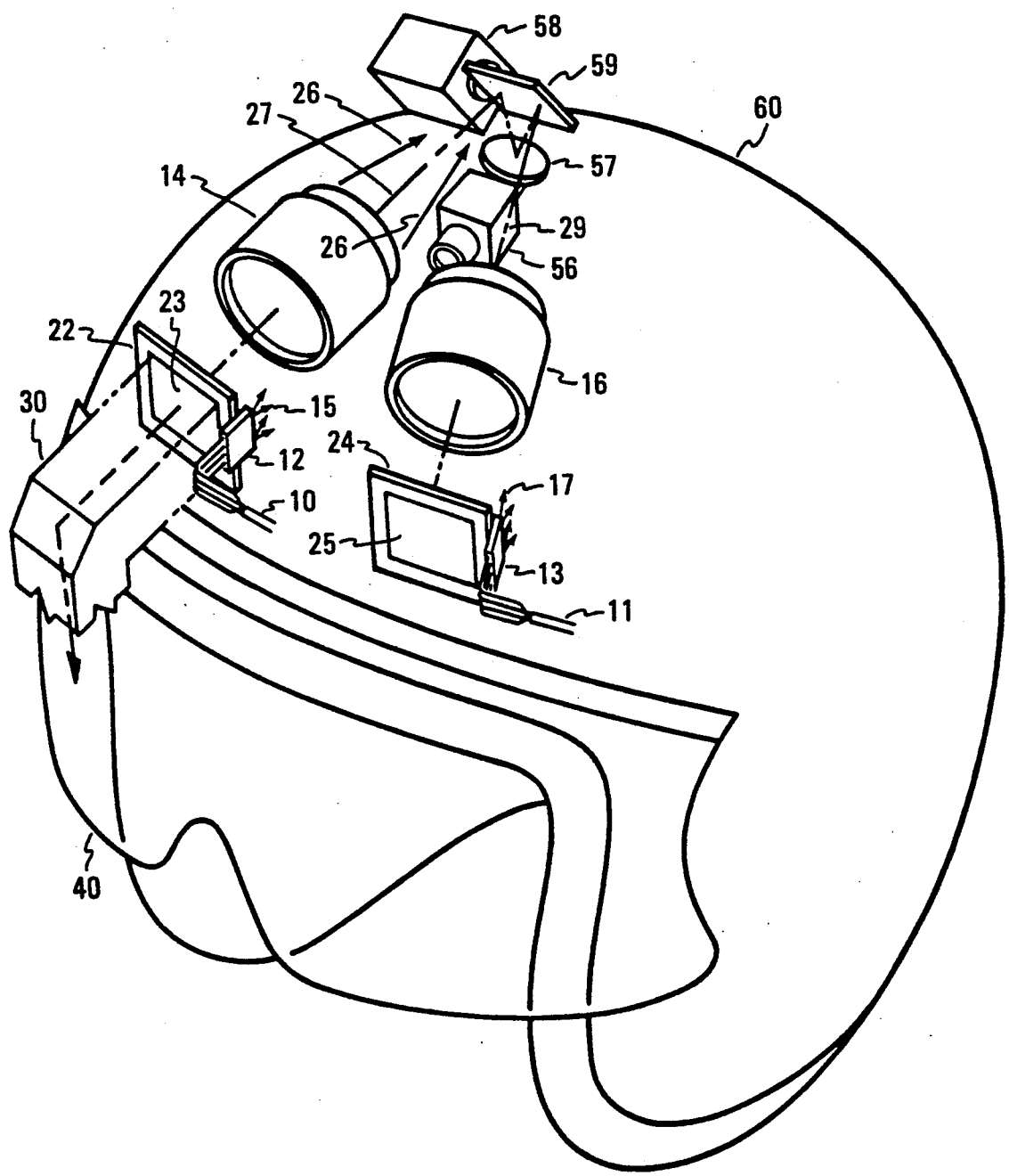
FIG. 3 is a top perspective view of another embodiment of a helmet mountable display system in accordance with the present invention.

Referring to FIG. 3, a top perspective view of another embodiment of a helmet mountable display system in accordance with the present invention is shown.

Support 12 and 13 along with corresponding fibers 10 and 11 are disposed on the same side (right as illustrated) of screen 22 and 24, respectively, with respect to helmet 60. Ends of fibers 10 and 11 constitute a respective column. Of course supports 12 and 13 could be mounted on the opposite side of screen 22 and 24, respectively. The same considerations for optical axis 27 and the positioning of screen 22 and support 12 with respect thereto apply here as they did for the embodiment shown in FIG. 1.

Vertical scanning means 58 includes mirror means 59 and horizontal scanning means 56 includes mirror means 57. Vertical scanning means 58 may be synchronized at 60 Hz and horizontal scanning means 56 may be synchronized at about 4000 Hz for providing a horizontally scanned raster image. Scanning means 56 and 58 may be analogous to scanning means 20 and 18, respectively.

Thus has been illustrated and described a self-contained, light weight full color stereoscopic display system.

While only certain preferred features of the invention have been shown by way of illustration, many modifications and changes will occur to those skills in the art. It is to be understood that the appended claims are intended to cover all such modifications and changes as fall within the true spirit and scope of the invention.

What is claimed is:

1. A helmet mountable display system for displaying a first raster-scanned image to a wearer of the helmet in response to a plurality of first light source means, each of the plurality of first light source means for supplying a respective first light signal having a respective first predetermined size, the display system comprising:

first lens means having a central optical axis and a first optical input/output and a second optical input/output respectively disposed about the central optical axis of the first lens means and optically coupled to each other, each input/output of the first lens means having a respective focal point lying on the central axis, the first input/output of the first lens means optically coupled to the plurality of first light source means for receiving each first light signal, the first lens means for providing a first collimated light pattern at the second input/output of the first lens means in response to each first light signal supplied to the first input/output of the first lens means;

a first deflecting surface oscillatable about a first axis and optically coupled to the second input/output of the first lens means for receiving the first collimated light pattern, the first deflecting surface for deflecting the first collimated light pattern in a first direction along a first predetermined optical path;

a second deflecting surface oscillatable about a second axis and optically coupled to the first deflecting surface for receiving the first collimated light pattern from the first deflecting surface, the second deflecting surface for deflecting the first collimated light pattern received from the first deflecting surface in a second direction along the first predetermined optical path;

second lens means having a central optical axis and a first optical input/output and a second optical input/output respectively disposed about the central axis of the second lens means and optically coupled to each other, each input/output of the second lens means having a respective focal point lying on the central axis, the second input/output of the second lens means optically coupled to the second deflecting surface for receiving the first collimated light pattern deflected from the second deflecting surface in the second direction along the first predetermined optical path, the second lens means focusing the first collimated light pattern received from the second deflecting surface; and first optical system means optically coupled to the first input/output of the second lens means for receiving the focused first collimated light from the second lens means, the first optical system means for transporting the focused first collimated light from the second lens means to the wearer such that the wearer may observe the first raster scanned image when the first and second deflecting surfaces are oscillating at a respective predetermined rate and displacement about the first and second axis respectively.

2. The display system as in claim 1, wherein each first light source means includes an optical waveguide for having an end, the end of the optical waveguide supplying the first light signal and the size of the end for determining the first predetermined size of the corresponding light signal, and further wherein the ends of the optical waveguide are disposed at a first focal plane of the first lens means, the first focal plane of the first lens means including the focal point of the second input/output of the first lens means and yet further wherein the first optical system means includes a planar surface for displaying the image of each of the first light signals, the planar surface of the first optical system means disposed coplanarly with a first focal plane of the second lens means, the first focal plane of the second lens means including the focal point of the second input/output of the second lens means.

3. The display system as in claim 2, wherein the first optical system means includes a visor surface viewable by the wearer, the visor surface optically coupled to the planar surface of the first optical system means for presenting the first raster scanned image to the wearer.

4. The display system as in claim 3, wherein the planar surface of the first optical system means is a rear projection screen.

5. The display system as in claim 3, wherein the first optical system means includes relay lens means optically coupled between the planar surface of the first optical system means and the visor surface, the relay lens means for transporting the image from the first screen means to the surface of the visor.

6. The display system as in claim 2, wherein the optical combination of the first and second lens means provides about a 1:1 image ratio from the end of the waveguide to the planar surface of the first optical system means.

7. The display system as in claim 1, wherein the image of the first light signals is scannable in a predetermined raster, the first deflecting surface providing the horizontal scan when oscillating about the first axis and the second deflecting surface providing the vertical scan when oscillating about the second axis.

8. The display system as in claim 1, wherein the image of the first light signals is scannable in a predetermined raster, the first deflecting surface providing the vertical scan when oscillating about the first axis and the second deflecting surface providing the horizontal scan when oscillating about the second axis.

9. The display system as in claim 7, wherein the predetermined raster is a horizontal sweep raster.

10. The display system as in claim 7, wherein the predetermined raster is a vertical sweep raster.

11. The display system as in claim 2, wherein the ends of the waveguide are disposed in a substantially horizontal row and the first and second deflecting surface are disposed to provide a vertical raster scanned image at the planar surface of the first optical system means.

12. The display system as in claim 2, wherein the ends of the waveguide are disposed in a substantially vertical row and the first and second deflecting surface are disposed to provide a horizontal scanned image at the planar surface of the first optical system means.

13. The display system as in claim 1, wherein the first and second deflecting surfaces are disposed with respect to each other and with respect to the first lens means such that the outer margin of the first collimated light pattern obtains a minimum diameter along the first optical path between and including the first and second deflecting surfaces.

14. The display system as in claim 1, wherein the first deflecting surface is further disposed such that the first collimated light pattern in the second direction along the first predetermined optical path is intercepted by the first deflecting surface and the second deflecting surface further for deflecting the collimated light pattern received from the second direction in a third direction along the first predetermined optical path and further wherein the second lens means further disposed for receiving the first collimated light pattern deflected from the second deflecting surface in the third direction.

15. The display system as in claim 1, the display system further for displaying a second raster-scanned image in response to a second plurality of light source means, each of the second plurality of light source means for supplying a respective second light signal having a respective second predetermined size, the display system further comprising:

second optical system means optically coupled to the first input/output of the first lens means, the second optical system means for displaying a second raster scanned image when the first and second deflecting surfaces are oscillating at a respective predetermined rate and displacement about the first and second axis, wherein the first input/output of the second lens means is optically coupled to the plurality of second light source means for receiving each second light signal, the second lens means further for providing a second collimated light pattern at the second input/output of the second lens means in response to each second light signal supplied to the first input/output of the second lens means, the first deflecting surface further optically coupled to the second input/output of the second lens means for receiving the second collimated light pattern, the first deflecting surface further for deflecting the second collimated light pattern in a first direction along a second predetermined optical path, the second deflecting surface further optically coupled to the first deflecting surface for receiving the second collimated light pattern from the first deflecting surface and further for deflecting the second collimated light pattern received from the first deflecting surface in a second direction along the second predetermined optical path, the second input/output of the first lens means further optically coupled to the second deflecting surface for receiving the second collimated light pattern deflected from the second deflecting surface in the second direction along the second predetermined optical path, the first lens means further for focusing the second collimated light pattern received from the second deflecting surface, and further the second optical system means optically coupled to the first input/output of the first lens means for receiving the focused first collimated light from the first lens means, the second optical system means for transporting the focused second collimated light from the first lens means to the wearer such that the wearer may observe the second raster scanned image.

16. The display system as in claim 15, wherein the first and second lens means are disposed with respect to each other such that the respective central optical axes form a V and further wherein the first and second deflecting surface are disposed substantially at the apex of the V.

17. The display system as in claim 15, further including visor display means having a visor surface viewable by the observer, the visor surface optically coupled to the first and second optical system means for presenting the first and second raster scanned image to the left and right eye, respectively, of the wearer for presenting a stereoscopic image to the observer.

18. A helmet mountable display system, comprising:
first lens means having a central optical axis, a first input/output, a second input/output, the first and second input/output optically coupled to each other and a first focal point with respect to the second input/output disposed on the central optical axis;

second lens means having a central optical axis, a first input/output, a second input/output, the first and second input/output optically coupled to each other and a first focal point with respect to the second input/output disposed on the central optical axis;

a first plurality of light source means for supplying a first light pattern, the first plurality of light source means optically coupled to the first input/output of the first lens means;

a second plurality of light source means for supplying a second light pattern, the second plurality of light source means optically coupled to the first input/output of the second lens means;

first screen means optically coupled to the first input/output of the second lens means for receiving the first light pattern;

second screen means optically coupled to the first input/output of the first lens means for receiving the second light pattern;

a first deflecting surface oscillatable about a first axis and optically coupled to the first lens means for receiving the first light pattern and further optically coupled to the second lens means for receiving the second light pattern; and a second deflecting surface oscillatable about a second axis and optically coupled to the first deflecting surface, the first deflecting surface further for deflecting the first light pattern in a first direction along a first predetermined optical path and for deflecting the second light pattern in a first direction along a second predetermined optical path the second deflecting surface for deflecting the first light pattern received from the first direction in a second direction along the first predetermined optical path and for deflecting the second light pattern received from a second direction along the second predetermined optical path, wherein a first raster scanned image is displayable by the second screen means in response to the first light pattern and a second raster scanned image is displayable by the first screen means in response to the second light pattern when the first and second deflecting surfaces are perturbating in a predetermined pattern about the respective first and second axes.

19. The display system as in claim 18, wherein each first and second plurality of light source means includes an optical waveguide having a respective end, the ends of the optical waveguide for supplying the corresponding first and second light pattern, the ends of the optical waveguide disposed at a corresponding first focal plane of the first and second lens means, the first focal plane of the first and second lens means including the focal point of the corresponding second input/output of the first and second lens means, the first and second light pattern including a respective outer margin and the first and second surface further disposed with respect to each other and with respect to the first and second lens means such that the margin of the first and second light patterns obtains a minimum diameter along the corresponding first and second optical path between and including the first and second deflecting surfaces.

20. A helmet mountable display system for providing a first full color raster scanned image to a wearer of the helmet, the first image in response to light from a first plurality of light sources, comprising:

first optical means for receiving light from each of the first plurality of light sources and for supplying a respective first ray of light in response to the light from each of the first plurality of light sources;

first lens means optically coupled to the first optical means, the first lens means for collimating the first rays of light;

first reflecting means optically coupled to the first lens means, the first reflecting means for deflecting the first rays of light in a first direction along a first predetermined optical path;

second reflecting means optically coupled to the first reflecting means for receiving the first rags of light that are deflected by the first deflecting means, the second reflecting means further for deflecting the first rays of light in a second direction along the first predetermined optical path;

second lens means optically coupled to the second reflecting means for receiving the first rays of light that are deflected by the second deflecting means, the second lens means for focusing the first rays of light; and first optical system means optically coupled to the second lens means, the first optical system means for transporting the first rays of light that have been focused to the wearer such that the wearer may observe the first full color raster scanned image, wherein the first and second directions of the first optical path are selected such that the first full color raster scanned image is available at a focal plane of the second lens means from the first rays of light that have been focused.

21. The display system as in claim 20, the display system further for providing a second full color raster scanned image to the wearer, the second image in response to light from a second plurality of light sources, comprising:

second optical means for receiving light from each of the second plurality of light sources and for supplying a respective second ray of light in response to the light from each of the second plurality of light sources; and second optical system means optically coupled to the first lens means, the first optical system means for transporting the second rays of light that have been focused to the wearer such that the wearer may observe the second full color raster scanned image, wherein the second lens means optically further coupled to the second optical means, the second lens means further for collimating the second rays of light, the first reflecting means further optically coupled to the second lens means, the first lens means further for deflecting the second rays of light in a first direction along a second predetermined optical path, the second reflecting means further optically coupled to the first reflecting means for receiving the second rays of light that are deflected by the second reflecting means, the second reflecting means further for deflecting the second rays of light in a second direction along the second predetermined optical path, the first lens means further optically coupled to the second reflecting means for receiving the second rays of light that are deflected by the second deflecting means, the first lens means further for focusing the second rays of light, and the first and second directions of the second optical path are selected such that the second full color raster scanned image is available at a focal plane of the first lens means from the second rays of light that have been focused, and further wherein the first and second image is supplied to the left and right eye, respectively, of the wearer, whereby a stereoscopic image may be presented to the wearer.

* * * * *

UNITED STATES PATENT AND TRADEMARK OFFICE
CERTIFICATE OF CORRECTION

PATENT NO. : 5,091,719

DATED : February 25, 1992

INVENTOR(S) : William S. Beamon, III

It is certified that error appears in the above-identified patent and that said Letters Patent is hereby corrected as shown below:

Col. 1, prior to line 3, add:

The invention described herein was made in the performance of work under NASA Contract No. NAS1-18711 and is subject to the provisions of Section 305 of the National Aeronautics and Space Act of 1958 (42 U.S.C. 2457).

Signed and Sealed this

Sixteenth Day of March, 1993

Attest:

STEPHEN G. KUNIN

Attesting Officer

Acting Commissioner of Patents and Trademarks